United States Patent [19]
Ericson et al.

[11] 3,879,867
[45] Apr. 29, 1975

[54] FASTENING MEANS FOR RETAINING A DIGGER TOOTH IN A SOCKET

[75] Inventors: John Einar Ericson, Karlskoga; Thrue Roland Anderson, Orebro, both of, Sweden

[73] Assignee: Aktiebolaget Bofors, Bofors, Sweden

[22] Filed: Nov. 1, 1973

[21] Appl. No.: 411,788

Related U.S. Application Data

[63] Continuation of Ser. No. 254,485, May 18, 1972, abandoned, which is a continuation of Ser. No. 879,770, Nov. 25, 1969, abandoned.

[30] Foreign Application Priority Data
Dec. 4, 1968  Sweden .................. 16588/68

[52] U.S. Cl. ..................... 37/142 A; 299/92
[51] Int. Cl. ............................. F16b 19/02
[58] Field of Search ......... 37/141 R, 141 A, 142 R, 37/142 A; 299/92

[56] References Cited
UNITED STATES PATENTS

| 2,702,490 | 2/1955 | Launder | 37/142 A X |
| 2,798,403 | 7/1957 | Launder | 37/142 A X |
| 2,837,844 | 6/1958 | Launder | 37/142 A |
| 2,982,035 | 5/1961 | Stephenson | 37/142 R |
| 2,987,332 | 6/1961 | Bonmartini | 37/142 A X |
| 2,991,569 | 7/1961 | Launder | 37/142 A |
| 3,277,592 | 10/1966 | Launder et al. | 37/142 A |
| 3,511,126 | 5/1970 | Watts | 37/142 A |
| 3,520,076 | 7/1970 | Nichols | 37/141 R |
| 3,520,224 | 7/1970 | Hensley et al. | 37/142 A |

Primary Examiner—E. H. Eickholt
Attorney, Agent, or Firm—Hane, Baxley & Spiecens

[57] ABSTRACT

A digger tooth having an elongate tapered root is releasably retained in a receiving opening of a socket by forcing a locking pin into staggered crosswise openings in the socket and the root of the tooth. This locking pin has a generally rectangular outline and is formed by two rigid lateral members with a resilient connecting element sandwiched therebetween. The lateral members and the connecting element are so arranged that the two lateral members are held spaced apart by the connecting element when the same is in its relaxed state but can move toward each other by a limited distance in response to crosswise pressure applied thereto. The locking pin can be forced into the openings from either side of the socket and will automatically lock itself in the socket and the tooth due to the pressure exerted by the connecting element via the lateral members against the lateral side walls of the openings.

6 Claims, 3 Drawing Figures

INVENTORS
JOHN EINAR ERICSON
THURE ROLAND ANDERSSON
BY Hane and Baxley
ATTORNEYS

FASTENING MEANS FOR RETAINING A DIGGER TOOTH IN A SOCKET

This application is a continuation application made under 37 CFR 1.60 of pending prior application Ser. No. 254,485, filed May 18, 1972, which in turn is a continuation of application Ser. No. 879,770, filed Nov. 25, 1969, both now abandoned.

The present invention relates to a fastening means for retaining a first member having an elongate tapering section, e.g., a digger tooth having a root section, in a second member having an elongate outwardly widening socket section, e.g., a tooth socket in a bucket, said socket section having a shape substantially complementary to the tapering section of the first member, by means of a locking pin comprising two spaced members joined together by a resilient joining member, consisting, e.g., of rubber, said locking pin being positioned in a channel extending substantially complementary to the tapering section of the first member, by means of a locking pin comprising two spaced members joined together by a resilient joining member, consisting, e.g., of rubber, said locking pin being positioned in a channel extending substantially perpendicular to the longitudinal direction of the tapering section of the first member and extending through both the tapering section of the first member and the second member, when the first member is fully inserted into the second member.

In a toothed digger bucket, the teeth are commonly inserted into hollow socket members which are affixed to the bucket. The teeth are often provided with an elongate tapering root section which is adapted to be inserted into said hollow socket member. To securely retain the tooth in the socket, the tooth root and the socket member are provided with holes or apertures which, when the root is in its end position in the socket, are in alignment to enable a locking pin to be inserted. The constructions hitherto used in practice have certain disadvantages, however. Thus, they require a comparatively accurate working of contacting surfaces of teeth and pins and of their apertures. Also, they do not provide sufficient security against unintentional removal of the locking pins during operation of the digger bucket.

The object of the present invention is to provide a fastening device of the type referred to, where the machining of, e.g., teeth and socket members made by die-forging is minimized and where attachment of a tooth in a socket member takes place in a simple manner and by means of simple tools (hammers) and wherein this attachment as well as detachment can take place (by proper design of the device) from either direction and in such attachment and detachment only a single member is used in addition to the tooth and the socket member, namely a specially formed locking pin.

Said objects are achieved by means of the special form of the locking means appearing from the appended claims.

In practical tests the present invention has been found to fully satisfy the requirements, and the teeth have not been removed from their sockets even under great stresses.

The invention will be described more in detail with reference to the accompanying drawings which illustrate embodiments thereof.

Figure 1:
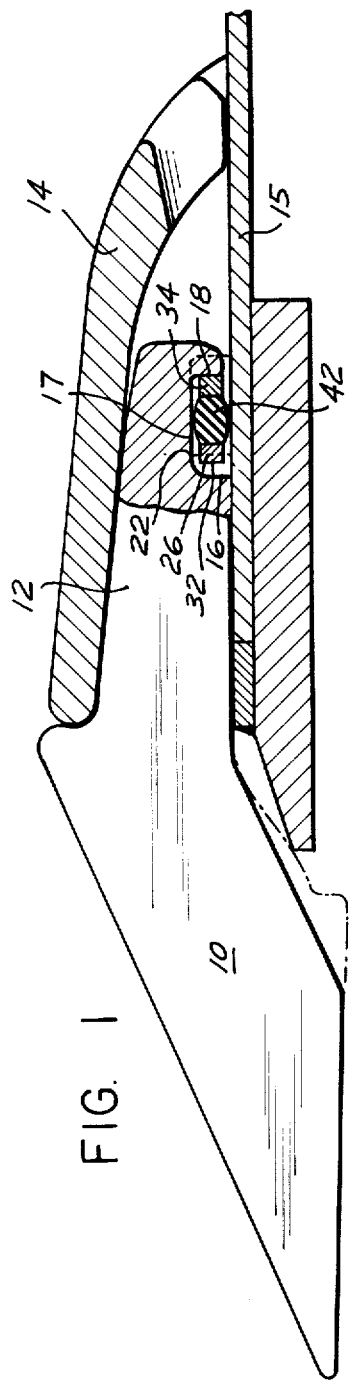
FIG. 1 is an elevation, partly in longitudinal section, showing a digger tooth inserted into a socket secured to the digger bucket and locked by a locking pin embodying the invention.

Referring to FIG. 1, the numeral 15 designates a steel plate, to which there is secured, as by welding, a member 14 which may consist of a forged member that extends down to and is joined to plate 15 as shown. After welding the member 14 to the plate 15 they form a socket member defining a socket which widens toward the left, as seen in FIG. 1. A tooth indicated generally by 10 is adapted to be inserted with its root end 12 into said socket. The tooth 10 has its just mentioned root end 12, which coincides substantially with the socket shape tapering towards the right, as seen in FIG. 1. Thus, it is possible to insert tooth 10 in the socket member 14 into a home or end position, in which the tooth is to be retained.

To enable the tooth to be retained in the socket, the root of the tooth 10 and the socket member 14 are provided with openings which are substantially aligned and arranged so that the axis of the passage formed by said openings is substantially perpendicular to the longitudinal axis of the tooth root 12. The opening 45 in the root 12 has a substantially rectangular cross-section and is defined by surfaces extending substantially perpendicular to the longitudinal axis of the root 12, namely a front wall 16 and a rear wall 18 and a top wall 17, at right angles to said front and rear walls. In the embodiment disclosed, there is no wall facing the top wall 17, since this surface of this wall coincides with the adjacent outer surface of the root 12, but of course, it is not necessary that the opening in the root extends to said outer surface; it can terminate short of said outer surface so that the opening will have four interior walls. This does not involve any difference in function, as will be readily appreciated.

Figure 2:
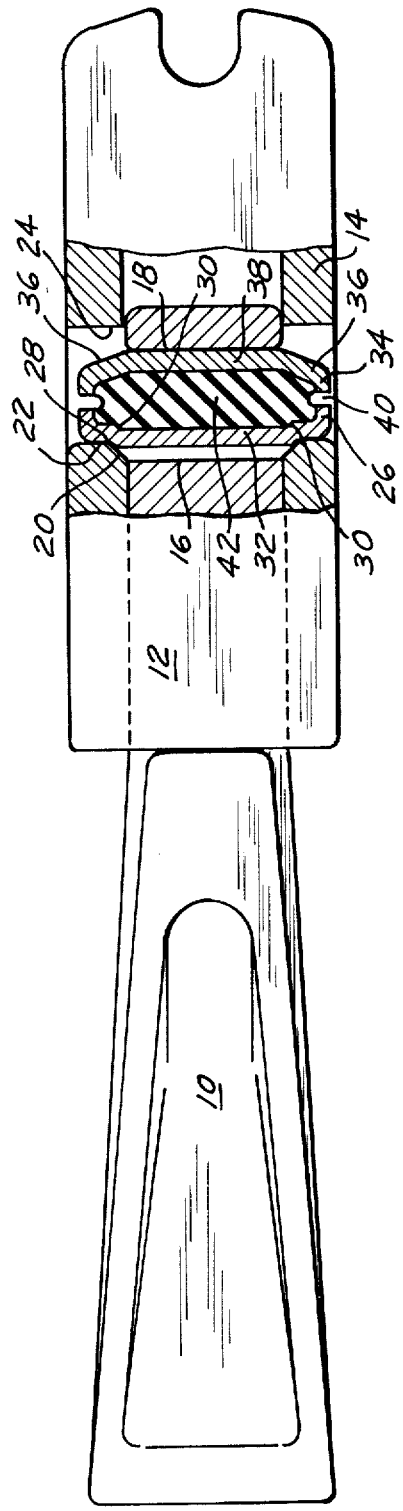
FIG. 2 is a top plan view, partly in section, of the arrangement shown in FIG. 1.

The socket member 14 also comprises openings, in the embodiment shown one opening 46 at each side of the socket member as seen in FIG. 2. Each opening is rectangular and is defined by a front wall 22 and a rear wall 24. Each of said openings also has a top wall substantially in alignment with the top wall 17 of the root opening and a bottom wall formed by the top surface of the plate 15. In this case too, an opening having four walls may be formed in the socket member 14 itself. The front wall 22 has a bevelled edge 20 (FIG. 2) at its inner end.

In the embodiment illustrated, it is to be noted that the front wall 16 of the tooth root 12 is positioned nearer to the mouth of the socket than the front walls 22 of the socket openings and the rear wall 18 of the root 12 is nearer to the mouth of the socket than the rear walls 24 of the socket openings. Thus, the substantially rectangular openings in the root 12 and socket member 14 are laterally displaced, when the tooth root is in the position shown, that is, in its end or home position so that the free width of the opening is determined by the front walls 22 of the socket openings and the rear wall 18 of the root opening. The reason therefor will appear in the following.

Inserted into and retained in the passage formed by the openings of socket member 14 and tooth root 12 is a locking pin 47 which is clearly shown in FIGS. 1 and 2. The locking pin is of substantially rectangular cross-section to conform to the passage in the socket member and the root. The locking pin comprises a front rigid metal member 26. The metal member 26 has a contour comprising a first portion extending longitudinally of the tooth root 12, and this portion merges with a portion 28 substantially perpendicular to said longitudinal direction. Then follows a portion 30 situated at an oblique angle to said longitudinal direction and finally a portion perpendicular to said longitudinal direction and comprising a considerable proportion of the length of the locking pin. Front member 26 is associated with a rear locking pin member 34 spaced from the front member 26, the member 34 commencing with a short portion parallel to the longitudinal direction of the tooth followed by an oblique portion 36 and a portion 38 at right angles to said longitudinal direction, the latter portion occupying a considerable proportion of the length of the locking pin. At the opposite end of the locking pin, the front member 26 and the rear member 34 are shaped in the same way as at the end just described, so that the locking pin is symmetrical about the longitudinal central axis of the tooth root and the socket in the position shown in FIG. 2.

The front and rear members 26 and 34 are separated by a space 40, selected with respect to the shape of the openings in the socket member and the tooth root to permit sufficient compression of the locking pin for insertion and removal. Between the front member 26 and the rear member 34 there is an intermediate member 42 of elastomeric material, preferably rubber. When rubber is used, the intermediate member may be bonded to the front and rear members in a manner known per se to provide good adhesion to said members. Using other elastomeric materials, bonding by means of a suitable adhesive substance may be employed. It will be seen that due to the configuration of the locking pin it can be compressed in the longitudinal direction of the tooth root 12 until the spaces 40 approach zero. This is of course critical for the use of the locking pin in the example described.

It will be apparent from the above description of the configuration of the root and socket openings and of the locking pin as well as from FIG. 2, that when the locking pin is inserted the front member sections 28 perpendicular to the longitudinal direction of the root will contact the front walls 22 of the socket opening and the rear member portion 38 will contact the rear wall 18 of the opening of the root 12. The oblique sections 30 of the front member 26 will cooperate with the bevelled edges 20 to lock the locking pin so that it cannot move transversely of the root and socket and therefore cannot leave the openings of the root and the socket in either direction. By selecting the dimensions so that the intermediate elastomer member 42 is under compression, when the tooth root 12 is in its fully pushed in or end position in the socket and the locking pin is inserted, a biasing force is obtained which attempts to move the front and rear member 26, 34 of the locking pin away from each other. It will be readily seen that it is not possible for the locking pin to move away from its position. As stated, the tooth root is pushed into its end position in the socket, and therefore no movement can occur of the root to the right, as seen in FIG. 2, which would result in the widening of the width of the passage. On the other hand, forces may occur due to use of the digger bucket which would tend to pull the tooth out of the socket. In such a case, the elastomeric numeric 42 will be compressed until the spaces 40 are reduced to zero. Thereupon, the metal members 26 and 34 engage each other and prevent further movement of the root out of the socket. When such an outwardly directed force ceases, the members will revert to the condition shown in FIG. 2 due to the action of the elastomeric material 42 as well as due to the forces normally occurring in operation, such forces tending to push the tooth into its socket. It will be appreciated that the compression of the locking pin is caused by and occurs simultaneously with a reduction of the width of the passage for the locking in so that it will not permit movement of the locking pin in its longitudinal direction whereby it might leave the tooth and socket. Thus, the arrangement provides assurance against unintentional removal of the locking pin in operation.

In spite of this, the locking pin is easily positioned and easily removed when desired. It is to be noted that on account of the oblique portion 36 of the rear member 34 the end of the locking pin will have a width (in the longitudinal direction of the tooth and socket) which is less than the distance between the walls 22 and 18. In addition to the oblique portion 36 on the rear member 34 there are the oblique surfaces 30 on the front member, so that a gradual transition to the portion 32 which is perpendicular to the longitudinal direction of the root, is obtained. Therefore, after the root 12 is pushed into its end position in the socket member 14, it is possible to insert the locking pin into the socket opening from one side with the front member 26 facing the socket mouth and by means of an applied external force, such as a blow of a hammer, drive the locking pin into position, the locking pin members 26 and 34 being moved toward each other with compression of the elastomeric material 42, as the surface portion 30 of the front member 26 strikes the outer edge of the wall 22 and the surface portion 36 of the rear member 34 strikes the edge of the wall 18 of the root opening. The compression is such that at its maximum it permits the surface portion 32 of the front member 26 and the surface portion 38 of the rear member 34 to be at a distance equal to the distance between the front wall 22 of the opening in socket member 14 and the rear wall 18 of the opening in the root. When the locking pin is driven in so far that the oblique surface portion 30 at the leading end of the front member 26 has reached the bevelled edge 20 at the wall 22 of the socket member opening, the oblique surface portion 30 at the trailing end of the front member is in a position in alignment with the bevelled edge 20 of the opening where the pin was inserted. During this movement, the elastomeric material 42 will cause the front and rear members 26, 34 to move away a distance equal to the distance in the longitudinal direction of the root 12 between the surfaces 28 and 32 of the front member 26, whereby the locking pin will snap into position as shown in FIG. 2.

Removal of an inserted locking pin takes place with the aid of a force acting on one end thereof, e.g., by a hammer blow.

Due to this simple manner of inserting and removing a locking pin according to this invention, the exchange of a digger tooth is a very simple procedure which may be carried out with simple tools and in a very short time.

To facilitate insertion and removal of the locking pin, the openings in the socket member and tooth root are suitably rounded as well as the corresponding edges of the locking pin.

Figure 2A:
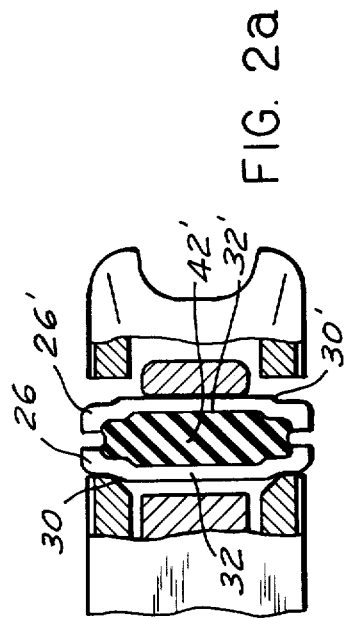
FIG. 2a is a fragmentary view, similar to FIG. 2, but showing a modification of the locking pin.

FIG. 2a shows a modified embodiment of the locking pin 47a comprising a front member 26 having portions 30 and 32 in the same manner as the locking pin in FIG. 2. In accordance with FIG. 2a, however, the rear member 26' is in all respects similar to the front member 26 and has similar portions 30' and 32'. The front and rear members are joined by the compressible resilient rubber member 42'. Thus, the locking pin of FIG. 2a is quite symmetrical with respect to its longitudinal vertical central plane which has the advantage that it can be inserted with either member 26 or member 26' facing outwardly.

It will be noted that in the embodiments described the distance between the top wall 17 of the openings and the bottom wall formed by plate 15 should suitably be somewhat greater than the vertical thickness of the elastomeric material 42 when relaxed to allow for lengthwise expansion thereof when the elastomeric material is compressed longitudinally if the members 26 and 34 are forced towards each other, as seen in FIG. 1.

Various modifications and variations are possible within the scope of the claims.

We claim:

1. Device for releasably retaining a digger tooth having an elongate tapering root section in a socket member formed with a corresponding inwardly tapered opening for receiving the root section in a predetermined end position within the socket member, said root section having an opening extending transversely of its longitudinal direction and the socket member having in its wall corresponding transverse openings through which root section and socket member openings a locking pin is insertable transversely to the longitudinal direction of the root section, said locking pin comprising two spaced apart rigid lateral members having plane outer surfaces disposed in parallel relationship and an elongate resilient connecting element interposed between said two lateral members bonded thereto, said resilient element permitting limited parallel movement of said members toward and away from each other, said openings in the root section and in the socket member of the digger tooth respectively being of rectangular cross-sectional outline and positioned so that when the root section is in said predetermined end position the transverse side walls defining the root section opening are displaced longitudinally relative to the transverse side walls defining the socket member openings, so that one transverse side wall of the root section opening is located intermediate the transverse side walls of the socket member openings and the other transverse side wall of the root section opening is outside the peripheral outlines of the socket member openings, said locking pin being of rectangular cross-sectional outline and having a cross-sectional width such that the plane outer surfaces of the lateral members engage the transverse walls defining the socket member openings and the root member opening with pressure engagement in the relaxed state of the resilient connecting element thereby releasably retaining the locking pin in said openings with a pressure fit, said lateral members of the locking pin having at both ends a pair of coplanar protrusions extending toward each other substantially in the longitudinal direction of the root section and in planar alignment with each other, the lengths of said protrusions being such that there is a gap between the facing ends of said protrusions when the resilient connection element is in a relaxed state, said gap permitting parallel limited movements of the lateral members toward each other thereby causing a corresponding reduction of the cross-sectional width of the locking pin in response to a driving force applied to either pair in the direction of the length of the lateral members for insertion and removal respectively of the locking pin as a unit from either side of the socket member.

2. Device according to claim 1, wherein the first and the second surface portions and the second and the third surface portions respectively are joined by oppositely slanted surfaces, said surface portions cooperating with bevelled edges at the inner edges of the socket member openings.

3. Device according to claim 1, wherein the other lateral member of the locking pin has adjacent each end thereof inclined surfaces, merging with a central surface substantially normal to the longitudinal direction of the root section and disposed further away from the mouth of the socket member than the ends of the locking pin.

4. Device according to claim 1, wherein the openings in the root section and the socket member have the greater dimension of their cross-sections extending in the longitudinal direction of the root, the smaller dimension of said cross-sections being slightly larger than corresponding smaller dimension of the locking pin.

5. Device according to claim 1 wherein the two rigid lateral members are alike whereby either lateral member may face the forward end of the digger tooth.

6. Device for releasably retaining a digger tooth having an elongate tapering root section in a socket member formed with a corresponding inwardly tapered opening for receiving the root section in a predetermined end position within the socket member, said root section having an opening extending transversely of its longitudinal direction and the socket member having in its walls corresponding transverse openings through which root section and socket member openings a locking pin is insertable transversely to the longitudinal direction of the root section, said locking pin comprising two complementary spaced apart rigid lateral members having plane outer surfaces disposed in parallel relationship and an elongate resilient connecting element interposed between said two lateral members bonded thereto, said resilient element permitting limited parallel movement of said members toward and away from each other, said openings in the root section and in the socket member of the digger tooth respectively being of rectangular cross-sectional outline and positioned so that when the root section is in said predetermined end position the transverse side walls defining the root section opening are displaced longitudinally relative to the transverse side walls defining the socket member openings, so that one transverse side wall of the root section opening is located intermediate the transverse side walls of the socket member openings and the other transverse side wall of the root section opening is outside the peripheral outlines of the socket member openings, said locking pin being of rectangular cross-sectional outline, the wall portions defining the socket openings and facing the receiving end of the socket including an outer wall portion substantially normal to the lengthwise direction of the socket and an inner outwardly slanted wall portion, and each of said lateral members having on its outside at each end a first wall portion substantially normal to the lengthwise direction of the socket, a second outwardly slanted wall portion continuing the first wall portion and a third wall portion connecting the respective second wall portions, each of the slanted second wall portions of the lateral member facing the receiving end of the socket engaging the respective slanted inner wall portion in the socket opening when the locking pin is inserted into the socket openings and digger tooth opening, the third wall portion on the opposite side engaging the respective wall portion of the socket opening adjacent thereto, thereby releasably retaining the locking pin in said openings with a pressure fit, said lateral members of the locking pin having at both ends a pair of coplanar protrusions extending toward each other substantially in the longitudinal direction of the root section and in planar alignment with each other, the lengths of said protrusions being such that there is a gap between the facing ends of said protrusions when the resilient connection element is in a relaxed state, said gap permitting parallel limited movements of the lateral members toward each other thereby causing a corresponding reduction of the cross-sectional width of the locking pin in response to a driving force applied to either pair in the direction of the length of the lateral members for insertion and removal respectively of the locking pin as a unit from either side of the socket member.

* * * * *